(12) United States Patent
Rudelic et al.

(10) Patent No.: US 8,225,042 B1
(45) Date of Patent: Jul. 17, 2012

(54) METHOD AND APPARATUS FOR PREVENTING FOREGROUND ERASE OPERATIONS IN ELECTRICALLY WRITABLE MEMORY DEVICES

(75) Inventors: John Rudelic, Folsom, CA (US); Lance Dover, Citrus Heights, CA (US)

(73) Assignee: Micron Technology, Inc., Boise, ID (US)

( * ) Notice: Subject to any disclaimer, the term of this patent is extended or adjusted under 35 U.S.C. 154(b) by 455 days.

(21) Appl. No.: 12/435,986

(22) Filed: May 5, 2009

(51) Int. Cl.
*G06F 13/14* (2006.01)
(52) U.S. Cl. .............................. 711/118; 711/3; 711/119
(58) Field of Classification Search .................. 711/118, 711/119, 3
See application file for complete search history.

(56) References Cited

U.S. PATENT DOCUMENTS

| | | | | |
|---|---|---|---|---|
| 5,787,445 | A | * | 7/1998 | Daberko .............................. 1/1 |
| 7,644,239 | B2 | * | 1/2010 | Ergan et al. .................... 711/154 |

\* cited by examiner

*Primary Examiner* — Son Dinh
(74) *Attorney, Agent, or Firm* — Berkeley Law & Technology Group, LLP

(57) ABSTRACT

Methods and systems are provided that may include a nonvolatile memory to store information, where the nonvolatile memory has a memory cache to store data corresponding to a received sector write operation, and a main memory comprising at least the designated memory block and a second memory block. A controller may reclaim at least one sector of the designated memory block and performing a write operation to write information from the memory cache in response to the received sector write operation to at least one sector of the second memory block.

20 Claims, 4 Drawing Sheets

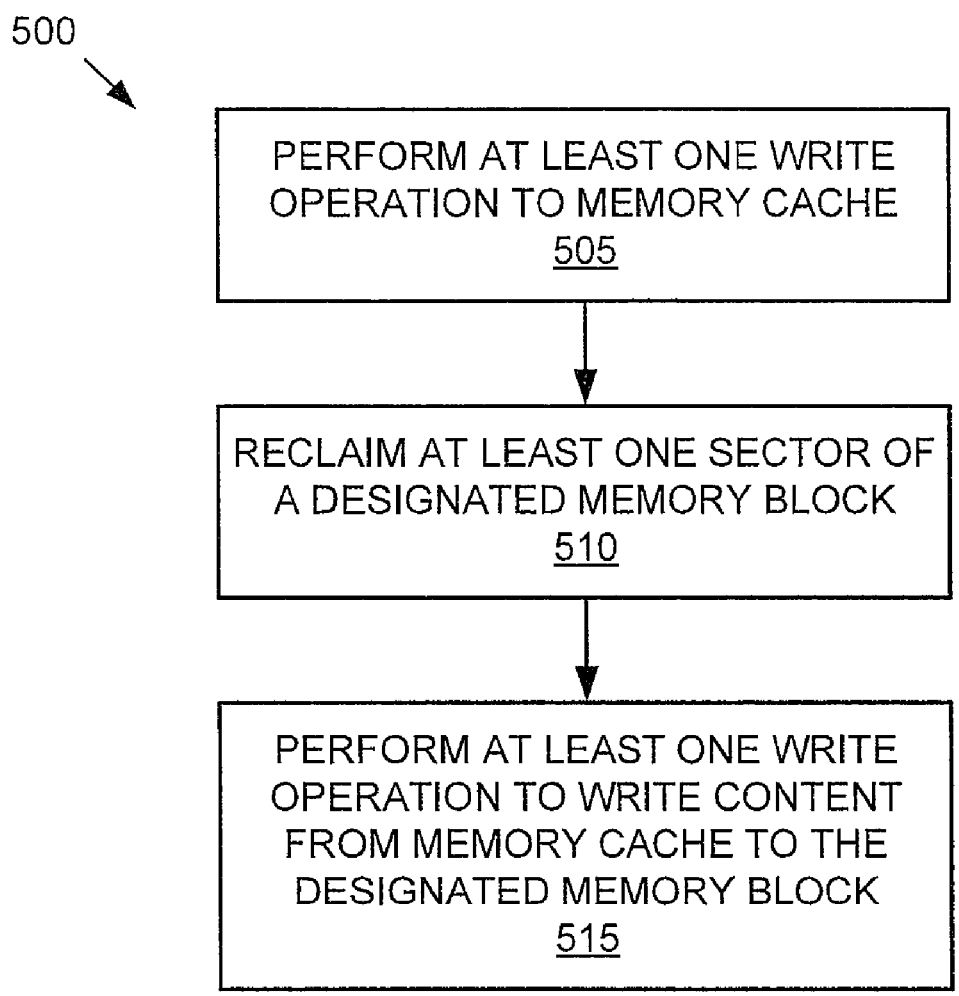

METHOD AND APPARATUS FOR PREVENTING FOREGROUND ERASE OPERATIONS IN ELECTRICALLY WRITABLE MEMORY DEVICES

BACKGROUND

1. Field

The subject matter disclosed herein relates to a method and apparatus for preventing certain erase operations in electrically writable devices.

2. Information

Nonvolatile memory devices, such as Phase-Change Memory ("PCM"), flash memory, or Electrically Erasable Programmable Read-Only Memory ("EEPROM") are sometimes packaged within an electrical system. For example, such nonvolatile memory devices may be sold within a computer system or a digital camera, for example. Such nonvolatile memory devices may store data or other information in various memory blocks. The first time that a nonvolatile memory device is used, its memory blocks may be empty such that data may be written to one or more sectors of such memory blocks. However, a situation may arise when data is to be written to a sector of a memory block to which data has previously been written. Even if data is only to be written to one sector of a memory block, it may be necessary to completely erase all sectors of such a memory block prior to writing data to such the one sector.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 5 is a flow diagram illustrating a process of performing a write operation to a nonvolatile memory according to one implementation.

DETAILED DESCRIPTION

Figure 1:
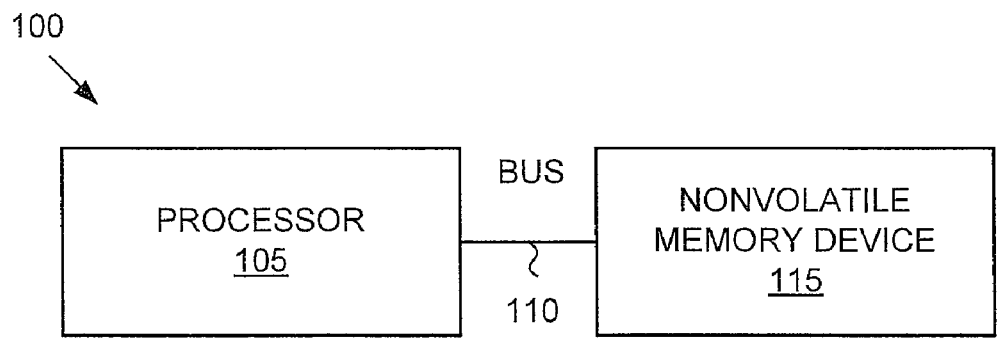
FIG. 1 is a schematic diagram of an electronic system according to one implementation.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some exemplary methods and systems are described herein that may be used to provide a way to perform write operations directly to a memory cache in a nonvolatile memory. One or more sectors in a specified memory block in physical nonvolatile memory cells may subsequently be erased. After being erased, data stored in a memory cache may then be moved into one or more sectors a clean or erased memory block.

A nonvolatile memory may include thousands of memory blocks, for example. A "memory block," as used herein, may refer to a unit of storage in a memory space. A memory block may include one or more sectors. A "sector," as used herein may refer to a subunit of memory storage. In one implementation, a 64-Kbyte memory block may include 64 one-Kbyte sectors.

A processor may transmit a write operation via a system bus, for example, to a nonvolatile memory. If a nonvolatile memory has recently been initialized or has "clean" memory blocks, such a write operation may write data or other information to a memory block immediately. As used here, "information" corresponding to a write operation may comprise, for example, data, code, or any other items capable of being written to a memory address or cell.

If a memory block already had data stored thereon, such data may need to be erased before new data may be written to such a memory block. In one implementation, an incoming write operation may indicate which particular sector of a memory block on which to write certain data. For example, if such a memory block includes multiple sectors, a nonvolatile memory device may not have any way of determining whether data stored in other sectors of such a memory device has been previously written and/or should be saved. For example, only one sector of a memory block may have had data written to it previously. However, a nonvolatile memory may not be able to determine whether such sectors are currently clean. Instead, a full erase process may be implemented to fully erase all of such sectors of such a memory block prior to writing data corresponding to a received write operation to a particular sector of such a memory block. A filesystem, for example, may have knowledge of which sectors are clean independent of the nonvolatile memory device.

In one implementation, a "reclaim operation" may be performed during an erase process. A "reclaim operation," as used herein may refer to a process of copying data from sectors of a memory block that are to be saved to corresponding sectors of a second memory block. If, for example a memory block includes 64 one-Kbyte sectors and an incoming write operation indicates that certain data is to be written to a first sector of such a memory block, implementation of a reclaim operation may involve copying data from 2nd through 64th sectors of a designated memory block to corresponding 2nd through 64th sectors of a second memory block. After such data have been copied, all 64 sectors of the original designated memory block may be erased. Also, data or other information corresponding to a received write operation may subsequently be written to a first sector of such a second memory block. Finally, a lower level translation table may be updated to indicate that contents of an original designated memory block have been move to such a second memory block. A lower level translation table may be updated so that a subsequent process may know where to find such designated data. Alternatively, a File System Allocation Table (FAT) may be updated based on a reclaim operation.

An implementation lacking a memory cache may allocate a substantial amount of overall memory blocks, such as 30%, for example, for short-term storage of data received via write operations. In such an implementation, a large number of memory blocks may not be used for permanent data storage and instead are utilized to temporarily store data while another memory block in main storage area is being erased. After being erased, such data may be copied into a "clean" memory block in a main storage area. Such an implementation, however, may not efficiently use memory blocks contained in a nonvolatile memory because a large number of memory blocks are used only for temporary storage of data.

In one implementation, data corresponding to one or more received write operations is written to a memory cache and then a designated memory block is subjected to a reclaim operation to erase one or more designated sectors in such a memory block. After such a reclaim operation is completed, data corresponding to a received write operation is written to one or more corresponding sectors of a second memory block. Such an implementation may have a much lower overhead than an implementation which does not utilize a memory cache. By using such a memory cache, a small number of memory blocks may be utilized for a dedicated memory cache, allowing many more memory blocks to be utilized in a main memory than would be possible in an implementation not utilizing such a memory cache. Use of such a memory cache may not be observable to a system processor, for example. Use of a memory cache may reduce or eliminate erase delays by providing an additional area to temporarily write to during a reclaim operation.

FIG. 1 is a schematic diagram of an electronic system 100 according to one implementation. Electronic system 100 may include a processor 105, a bus 110, and a nonvolatile memory device 115. Processor 105 may be adapted to generate a write command/operation to write data or other information to one or more sectors of one or more memory blocks of nonvolatile memory device 115, and/or to generate a read command to read data or other information from nonvolatile memory device 110. In one implementation, processor 105 may designate specific sectors within nonvolatile memory device 115 to which data is to be written. Alternatively, a controller within nonvolatile memory device 115 may determine a particular sector to which data is to be written. Processor 105 may transmit a write command/operation, for example, across bus 110 to nonvolatile memory device 115. Nonvolatile memory device 100 may comprise, for example, a flash memory, Phase-Change Memory ("PCM"), or Electrically Erasable Programmable Read-Only Memory ("EEPROM"), just to name a few examples.

Figure 2:
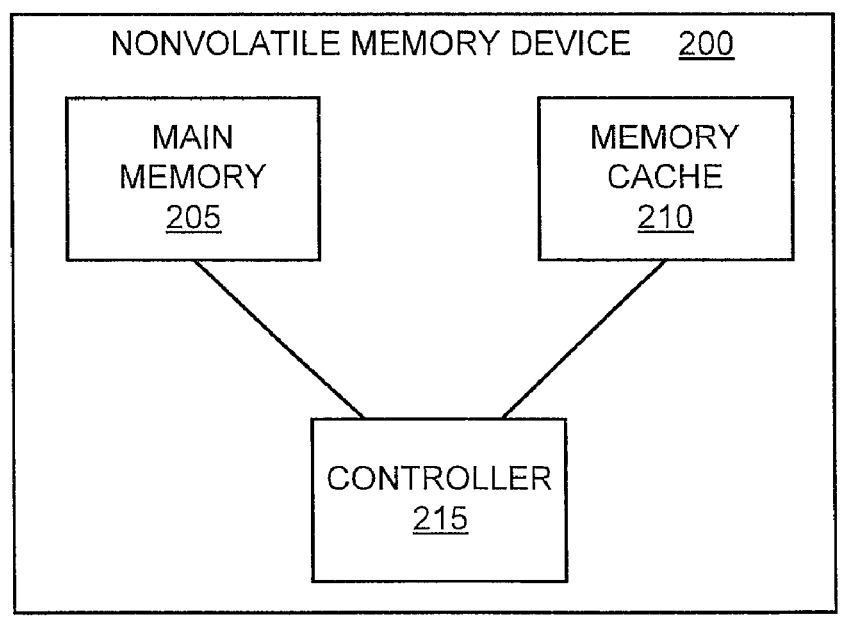
FIG. 2 is a schematic diagram of a nonvolatile memory device according to one implementation.

FIG. 2 is a schematic diagram of a nonvolatile memory device 200 according to one implementation. As shown, nonvolatile memory device 200 may include a main memory 205, a memory cache 210, and a controller 215. Main memory 205 may include various memory blocks where data may be written and stored. Memory cache may include one or more memory blocks where data may be temporarily stored while a particular memory block is undergoing a reclaim operation, as discussed above. When content of sectors copied from a particular memory block to a second memory block has been completed, data stored in memory cache may be copied to one or more empty sectors of such a second memory block. A memory block in memory cache 210 in which such data was stored may subsequently be erased.

In one implementation, a memory block in memory cache 210 may have a different size from a memory block in main memory 205. For example, if it is known that write operations are typically going to include only data to be written to only two sectors, instead of data to be written to 64 sectors of a memory block in main memory 205, a memory block in memory cache 210 may contain fewer than 64 sectors. For example, a memory block in memory cache 210 may include four sectors in one particular implementation.

Controller 215 may determine whether a memory block is clean or fully erased such that data corresponding to a received write operation may be written to such a memory block. If such a clean memory block is not available, controller 215 may perform such a write operation to memory cache 210 and may subsequently copy such data corresponding to such a write operation to a memory block in main memory 205 after a reclaim operation for a memory block has been completed.

Figure 3:
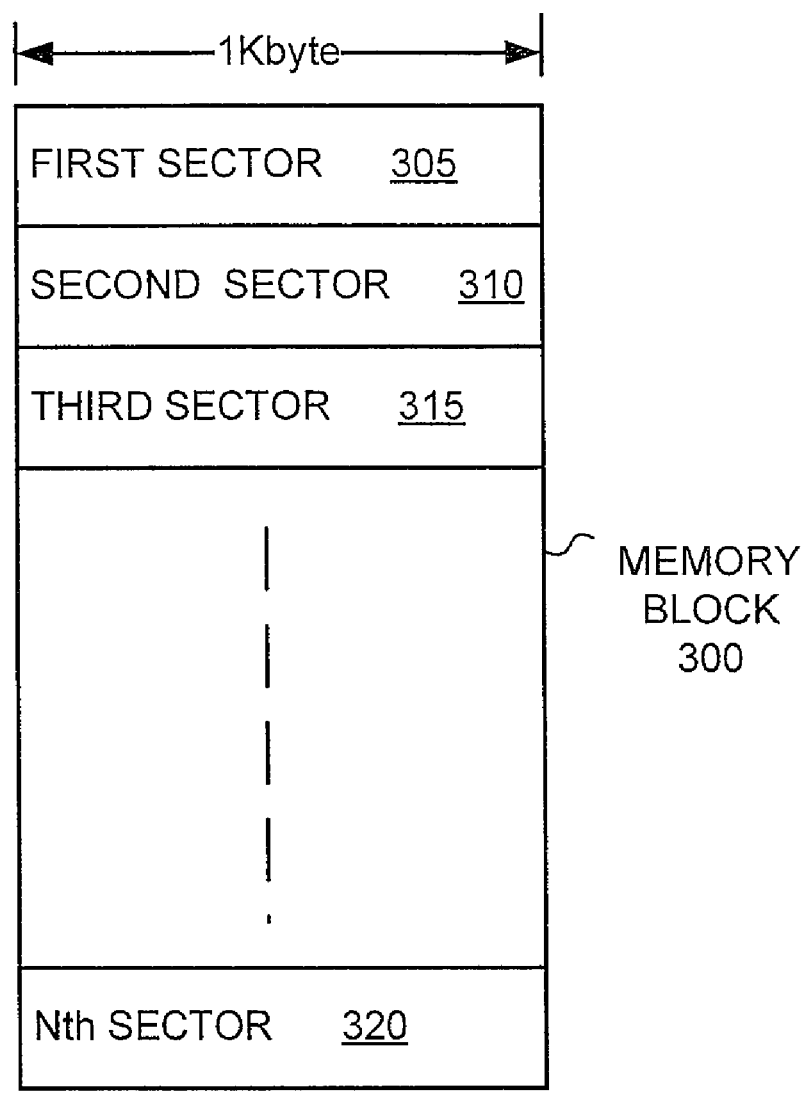
FIG. 3 is a schematic diagram of a memory block according to one particular implementation.

FIG. 3 is a schematic diagram of a memory block 300 according to one particular implementation. In this example, memory block 300 includes a number of sectors, each have a size equal to one-Kbyte. Memory block may include a first sector 305, a second sector 310, a third sector 315, and additional sectors up through an Nth sector 320. In one implementation, a memory block 300 may include 64, 128, or 256 sectors, for example. Although first sector 305 is shown as being located at the top of memory block 300, it should be appreciated that first sector 300 may be located at the bottom of memory block 300 in some implementations.

Figure 4:
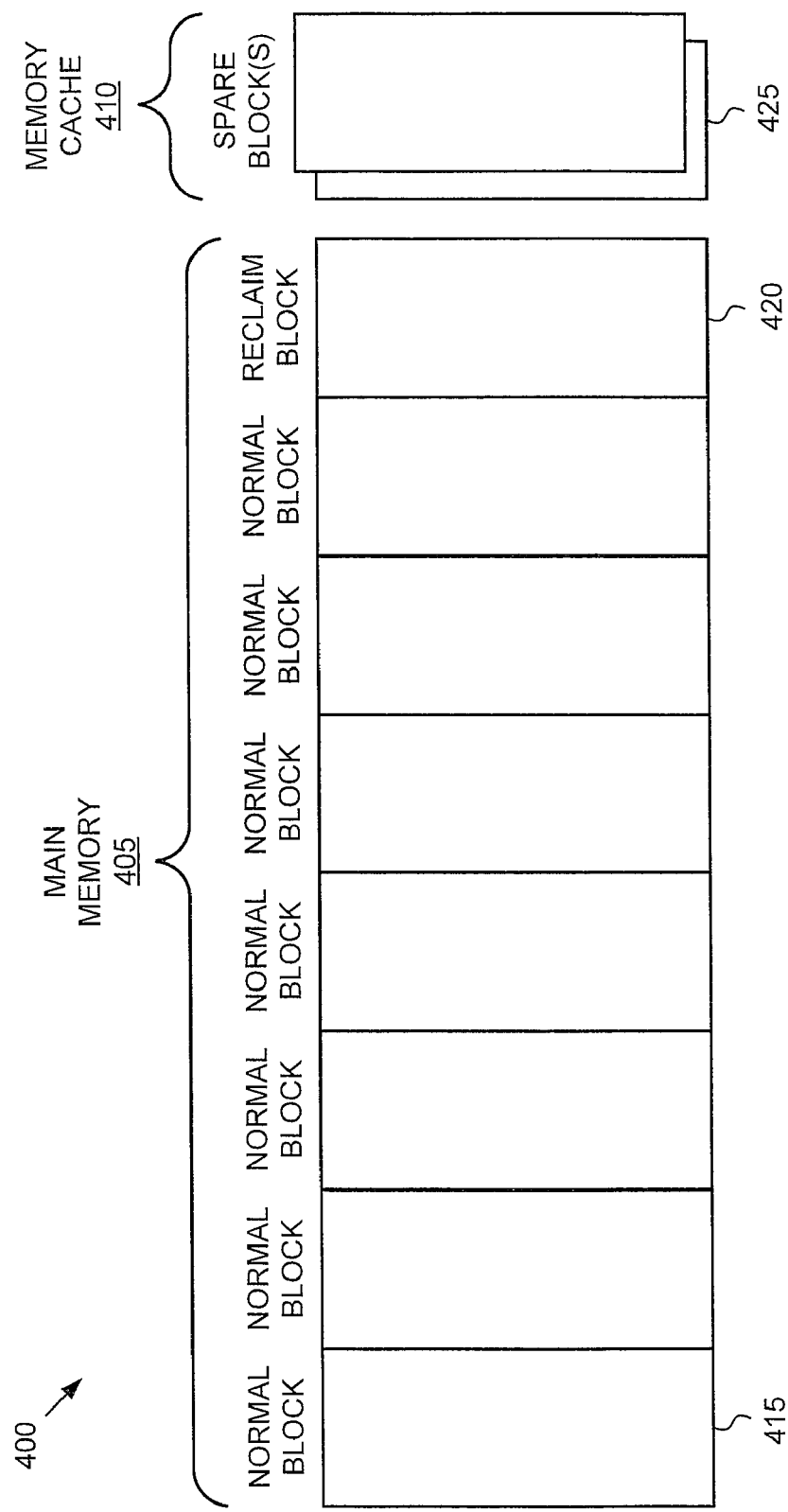
FIG. 4 illustrates memory blocks of a nonvolatile memory according to one implementation.

FIG. 4 illustrates memory blocks of a nonvolatile memory 400 according to one implementation. As shown, nonvolatile memory 400 may include a main memory 405 and a memory cache 410. Main memory 405 may include various normal memory blocks 415 in which data may be stored. Main memory 405 may also include a reclaim block 420. Reclaim block 420 may be a clean or fully erased memory block to which data may be written. If data is to be written to a particular sector of a normal memory block 415, data contained in all other sectors of such a normal memory block 415 may be copied to corresponding sectors of reclaim block 420 as part of a reclaim operation. Normal memory block 415 may subsequently be erased. After being erased, such a clean normal memory block 415 may then be designated as a new reclaim block and previous reclaim block may be designated as a normal block. Such designation updates may be performed via a FAT accessible by a controller of nonvolatile memory device 400.

Memory cache 410 of nonvolatile memory 400 may include one or more spare memory blocks 425. Such spare memory blocks 425 may be utilized to store data from received write operations temporarily until a reclaim operation is completed within main memory 405. After a reclaim operation has been completed, data stored in one or more spare memory blocks 425 may be written to one or more corresponding sectors or one or more normal memory blocks 415 within main memory. After such data has been moved, one or more spare blocks 425 may be erased and then reused for a similar operation.

FIG. 5 is a flow diagram illustrating a process 500 of performing a write operation to a nonvolatile memory according to one implementation. First, at operation 505, at least one write operation may be performed to a memory cache of a nonvolatile memory based on a received sector write operation. A received sector write operation may correspond to at least one sector of a designated memory block. Next, at operation 510, at least one sector of the designated memory block may be reclaimed via a reclaim operation. Finally, at operation 515, a write operation may be performed to write information, such as data, from the memory cache based on the received sector write operation to at least one sector of a second memory block.

A method and system, as discussed herein, may make efficient use of memory blocks in a nonvolatile memory. Such a nonvolatile memory may include several memory blocks in a memory cache that may be utilized to temporarily store data associated with received write operations while corresponding memory blocks in a main memory are being reclaimed/erased. After such a reclaim operation has been completed, such data stored in a memory cache may be copied/written to a memory block in main memory of such a nonvolatile memory device.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   performing at least one write operation to a nonvolatile memory cache disposed within a nonvolatile memory device comprising a nonvolatile main memory and the nonvolatile memory cache in response to a received sector write command, the received sector write command corresponding to at least one sector of a designated memory block;
   reclaiming the at least one sector of the designated memory block;
   performing a write operation to write information from the nonvolatile memory cache based at least in part on the received sector write command to at least one sector of a second memory block.

2. The method of claim 1, wherein the designated memory block comprises the at least one sector and at least one remainder sector, wherein the reclaiming comprises copying remainder information of the at least one remainder sector to at least one corresponding sector of the second memory block.

3. The method of claim 2, wherein the reclaiming further comprises erasing information of the designated memory block after copying the information of the at least one remainder sector to at least one corresponding sector of the second memory block.

4. The method of claim 1, wherein the nonvolatile memory cache comprises at least one cache memory block.

5. The method of claim 1, wherein the at least one cache memory block has a different size from the designated memory block.

6. The method of claim 2, further comprising updating a File System Allocation Table to indicate that the remainder information has been moved from the designated memory block to the second memory block.

7. A nonvolatile memory device, comprising:
   a nonvolatile memory cache to store data corresponding to a received sector write command corresponding to at least one sector of a designated memory block;
   a nonvolatile main memory comprising at least the designated memory block and a second memory block; and
   a controller to reclaim the at least one sector of the designated memory block and perform a write operation to write information from the nonvolatile memory cache at least partially in response to the received sector write command to at least one sector of the second memory block.

8. The nonvolatile memory device of claim 7, wherein the designated memory block comprises the at least one sector and at least one remainder sector, wherein the reclaiming comprises copying remainder information of the at least one remainder sector to at least one corresponding sector of the second memory block.

9. The nonvolatile memory device of claim 8, wherein the controller is adapted to erase information of the designated memory block after copying the information of the at least one remainder sector to at least one corresponding sector of the second memory block.

10. The nonvolatile memory device of claim 7, wherein the nonvolatile memory cache comprises at least one cache memory block.

11. The nonvolatile memory device of claim 7, wherein the at least one cache memory block has a different size from the designated memory block.

12. The nonvolatile memory device of claim 7, wherein the nonvolatile memory device comprises a flash memory device.

13. The nonvolatile memory device of claim 7, wherein the nonvolatile memory device comprises a PCM memory.

14. A system, comprising:
   a processor to generate and transmit a sector write command;
   a nonvolatile memory device to:
     receive the sector write command;
     perform at least one write operation to a nonvolatile memory cache disposed within of a nonvolatile memory device comprising a nonvolatile main memory and the nonvolatile memory cache based on the received sector write command, the received sector write command corresponding to at least one sector of a designated memory block;
     reclaim the at least one sector of the designated memory block; and
     perform a write operation to write information from the nonvolatile memory cache at least partially in response to the received sector write command to at least one sector of a second memory block.

15. The system of claim 14, wherein the designated memory block comprises the at least one sector and at least one remainder sector, wherein the reclaiming comprises copying remainder information of the at least one remainder sector to at least one corresponding sector of the second memory block.

16. The system of claim 15, wherein the controller is adapted to erase information of the designated memory block after copying the information of the at least one remainder sector to at least one corresponding sector of the second memory block.

17. The system of claim 14, wherein the nonvolatile memory cache comprises at least one cache memory block.

18. The system of claim 14, wherein the at least one cache memory block has a different size from the designated memory block.

19. The system of claim 14, wherein the nonvolatile memory device comprises a flash memory device.

20. The system of claim 14, wherein the nonvolatile memory device comprises a PCM memory device.

* * * * *